United States Patent
Hou (10) Patent No.: US 9,094,114 B1
(45) Date of Patent: Jul. 28, 2015

(54) TRANSCEIVER ARCHITECTURE WITH IMPROVED CAPACITY AND INTERFERENCE MITIGATION

(71) Applicant: ViaSat, Inc., Carlsbad, CA (US)

(72) Inventor: Jason Hou, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 14/542,494

(22) Filed: Nov. 14, 2014

Related U.S. Application Data (60) Provisional application No. 61/904,661, filed on Nov. 15, 2013.

(51) Int. Cl.
*H04B 1/38* (2006.01)
*H04B 15/00* (2006.01)
*H04L 12/28* (2006.01)

(52) U.S. Cl.
CPC .............. *H04B 15/00* (2013.01); *H04L 12/28* (2013.01)

(58) Field of Classification Search
CPC ............ H04L 27/2601; H03F 2200/294; H03M 1/12
USPC .......................... 375/219, 222, 223
See application file for complete search history.

(56) References Cited

U.S. PATENT DOCUMENTS

| | | | | |
|---|---|---|---|---|
| 7,885,344 | B2 * | 2/2011 | Nakayama et al. | 375/260 |
| 2004/0047285 | A1 * | 3/2004 | Foerster et al. | 370/210 |
| 2011/0163900 | A1 * | 7/2011 | Pagnanelli | 341/143 |

* cited by examiner

*Primary Examiner* — Don N Vo
(74) *Attorney, Agent, or Firm* — Greenhaus & Pendergrass, LLP; Bruce W. Greenhaus (57) ABSTRACT

A transceiver having substantially improved capacity and interference mitigation. The transceiver comprises a first direct conversion receiver (DCR) and a plurality of additional DCRs, each of the plurality of additional DCRs having essentially identical constituent components to the first DCR. Each DCR does a direct down-conversion from RF to a complex pair of baseband I and Q components. The complex signal pair from each DCR is digitized and further processed in a modem module where the signal is optimally filtered, demodulated, and error-corrected. The modem module reconstructs the message information contained in each signal from all of the DCR's, simultaneously providing the demodulated data that was contained in the RF signals. The dynamic range of the system is extremely large (i.e., approximately 80 dB).

15 Claims, 10 Drawing Sheets

FIGURE 10

TRANSCEIVER ARCHITECTURE WITH IMPROVED CAPACITY AND INTERFERENCE MITIGATION

RELATED APPLICATIONS

This application claims priority from United States provisional application entitled "TRANSCEIVER ARCHITECTURE WITH IMPROVED CAPACITY AND INTERFERENCE MITIGATION", Ser. No. 61/904,661, filed 15 Nov. 2013, which is incorporated herein by reference.

TECHNICAL FIELD

The disclosed method and apparatus relates to communications systems and more specifically to transceivers for receiving and transmitting broadband radio frequency signals.

BACKGROUND

Wireless communications systems rely on the behavior of radio frequency (RF) signals that propagate through space. These RF signals are commonly referred to as "carrier" signals, since information can be modulated on them and carried from the transmitter to a distant receiver over the air. In many cases, such information is modulated onto an intermediate frequency (IF) signal before being "up-converted" to the RF signal. Likewise, when RF signals are received, they are down-converted to IF. The IF signals can be more conveniently processed than the RF signals. This process of converting a received RF signal to an IF signals before down-conversion to baseband is called "superhetrodyning". Virtually all modern radio receivers use superhetrodyning. The cost of the additional frequency conversion stage yields the benefit of better selectivity and sensitivity compared with simpler designs.

One area in which superhetrodyning is used is in receivers for receiving Link 16 signals. Link 16 is a military tactical data exchange network. Using Link 16, military aircraft, ships and ground forces can exchange information, including tactical information with very little delay from transmission to reception. Link 16 is a TDMA-based secure, jam-resistant high-speed digital data link that operates in the band of 960-1,215 MHz.

SUMMARY

The presently disclosed apparatus is a transceiver having substantially improved capacity and interference mitigation. The transceiver comprises a first direct conversion receiver (DCR) and a plurality of additional DCRs, each of the plurality of additional DCRs having essentially identical constituent components to the first DCR. In accordance with one embodiment of the disclosed apparatus, twelve such DCRs are provided within a transceiver. A first group of four DCRs from among the twelve DCRs are provided to receive Link 16 signals. Each of these four DCRs receive the Link 16 signals in a sub-band that has a frequency range that is unique from the frequency range of the sub-bands received by each of the other three DCRs in this first group of four. The first group of four DCRs receives signals from a first antenna.

A second group of four DCRs receiver Link 16 signals from a second antenna. Each of the DCRs within the second group receive the Link 16 signals in same frequency sub-band as a corresponding one of the DCRs of the first group of four.

In addition, in accordance with one embodiment of the disclosed apparatus, two DCRs are provided to receive Tactical Air Navigation (TACAN) signals. The first receives the TACAN signals from the first antenna and the second TACAN DCR receives signal from the second antenna.

Still further, in accordance with one embodiment of the disclosed apparatus, two additional DCRs are provided to received identification friend or foe (IFF) signals. The first of the IFF DCRs received signals from the first antenna and the second from the second antenna.

Each DCR does a direct downconversion from RF to a complex pair of baseband I and Q components. The complex signal pair from each DCR is digitized and further processed in a modem module, such as a Field-Programmable Gate Array (FPGA), where the signal is optimally filtered, demodulated, and error-corrected. The modem module reconstructs the message information contained in each signal from all of the DCR's, simultaneously providing the demodulated data that was contained in the RF signals. The dynamic range of the system is extremely large (i.e., approximately 80 dB).

BRIEF DESCRIPTION OF THE DRAWINGS

The disclosed apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

The transceiver architecture described herein provides substantially improved capacity and interference mitigation.

The L-band modem receiver is comprised of twelve direct conversion receivers. For Link 16 operations, the spectrum is divided into four RF sub-bands, each with about 45 MHz in bandwidth. The sub-banding reuses the MIDS JTRS transceiver's RF structure so as to take advantage of the available RF SAW filters that are already in volume production.

There are four RF subbands for each Link 16 receive antenna. A direct conversion receiver positions the LO in the middle of each subband and digitizes the 45 MHz RF signal directly into digitized baseband IQ at a 120 MHz sampling rate. For dual Link 16 antenna operations as in the F-22 configuration, a total of eight direct conversion receivers are used and four RFLOs are shared among the receivers. These receivers are operational at all times monitoring the 153 MHz of Link 16 channels cooperatively. The four RFLOs are positioned between Link-16 carrier frequencies to further mitigate the low-level DC offset that is inherent in the DCR architecture. These RFLOs are tuned to 988.5, 1059, 1135.5, and 1183.5 MHz. For channel limiting and anti-aliasing of ADC sampling, analog Chebychev lowpass filters replace conventional super-heterodyne IF SAW filters and can be individually fine-tuned to the desired bandwidth. Additionally, the high 120 MHz sampling rate allows greater attenuation of aliased images to further alleviate out-of-band interference rejection.

For IFF full receive diversity operations, two direct conversion receivers are dedicated and tuned to the same 1030 MHz RFLO, each dedicated to an antenna path. The channel bandwidth of the direct conversion receiver is fine-tuned to 14 MHz bandwidth. There are two diversity receivers tuned to 1090 MHz for TACAN operations. These receivers can be reused for IFF interrogation replies.

For TACAN, channels that are collocated in the Link-16 frequencies are retrieved from the Link 16 RF subband diversity receivers. For TACAN channels that are in the 1030 MHz IFF band, the baseband IQ signals are retrieved from the IFF dedicated 1030 MHz diversity receivers. In the case of TACAN channels in the 1090 MHz IFF bands, two direct conversion receivers are tuned to 1090 MHz and perform full-diversity TACAN channel reception. These two 1090 MHz IFF receivers will be shared with IFF interrogator receivers when IFFI function is implemented in the future.

To sum up, the twelve direct conversion receivers perform full receive diversity from dual antenna paths and monitor the complete L-band RF signals from 960 MHz to 1,210 MHz in a staring fashion. RF sub-banding is allocated for optimal out-of-band rejection and signal dynamic range based on waveform characteristics.

Figure 1:
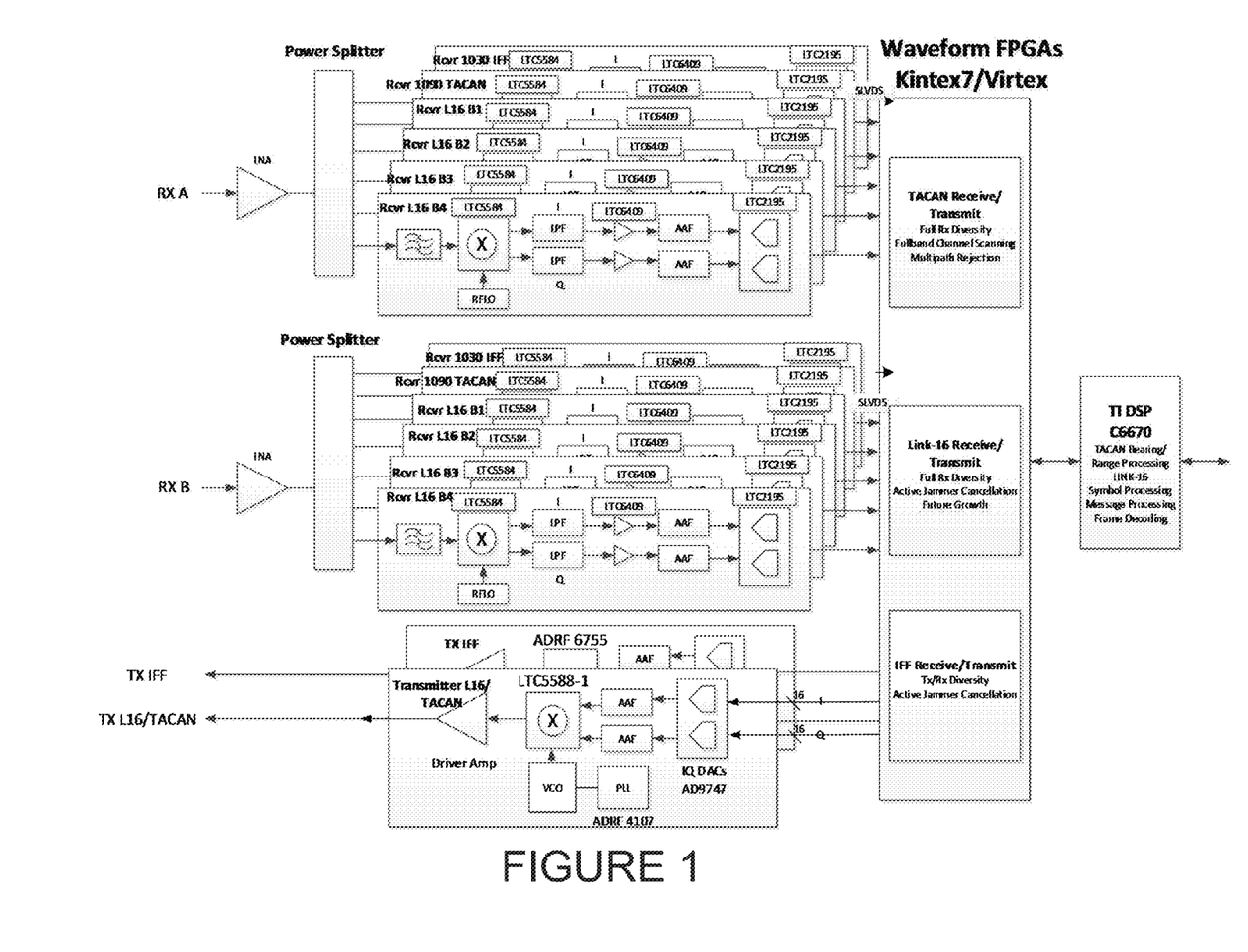
FIG. 1 is an illustration of an L-band transceiver functional block diagram.
Figure 2:
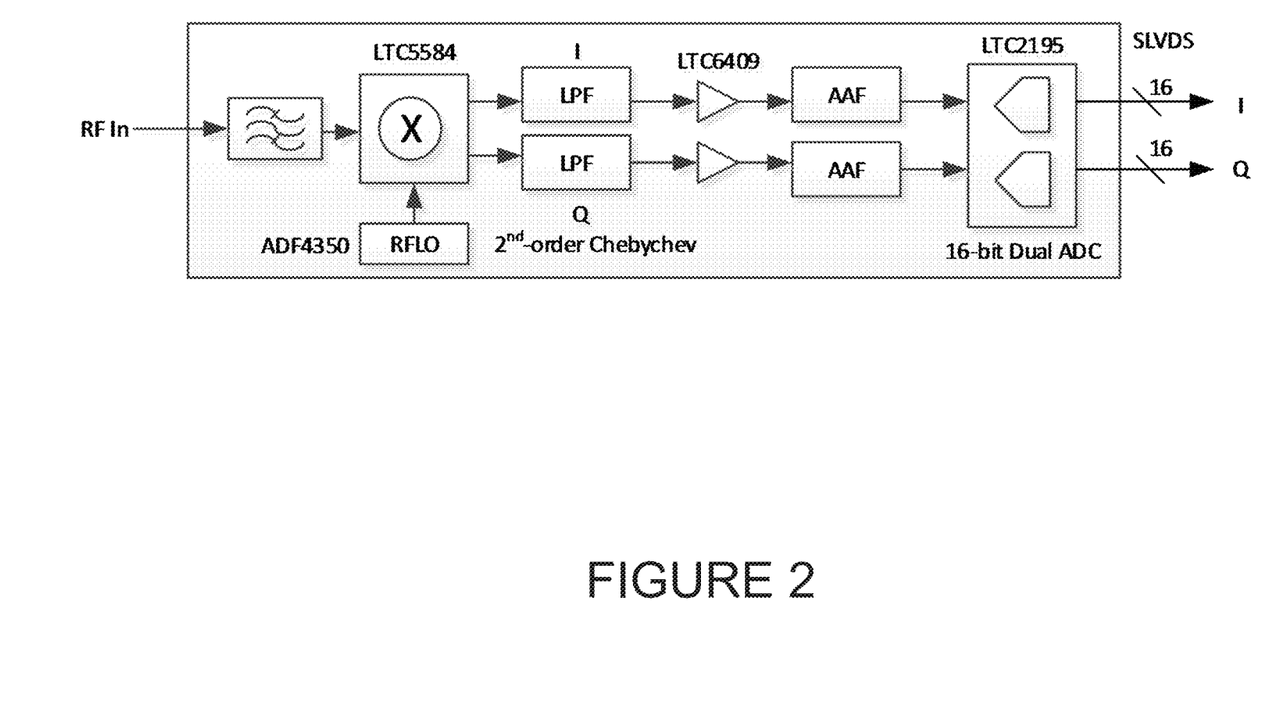
FIG. 2 is an illustration of a 16-bit direct conversion receiver block diagram.

The basic building block of the direct conversion receiver is shown in FIG. 2. It is composed of a highly linear IQ demodulator from Linear Technology LTC5584 that has second-order input intercept point (IIP2) greater than +60 dBm. The third-order input intercept point (IIP3) can be calibrated to be greater than +85 dBm. After down conversion into IQ branches, the bandwidth limiting is performed by a pair of matching Chebychev analog lowpass filters. A very low noise differential OPAM LTC6409 adapts the signal level to a dual 16-bit IQ ADC.

Advantages of the direct conversion receiver include:
Identical constituent components for all receivers. Receiver RF subband bandwidth is controlled and fine-tuned by the analog low-pass filters. RF SAW filters serve as RF bandwidth preselectors to minimize impacts of strong out-of-band interferers on the limited signal dynamic range of the receiver.
Minimized component counts for a receiver by removing IF stages and thereby reducing the number of IF gain stages. Signal dynamic range is preserved to allow ADC to be the limiting factor of signal dynamic range. The usable signal dynamic range is over 80 dB.
Analog second-order Chebychev low-pass filters replace conventional superheterodyne IF SAW filters. The signal rejection can be sharper and easier to implement. The bandwidth limiting can be fine tuned to desired bandwidth without resorting to expensive IF SAW filter fabrication.
The RF LO falls in the middle of the occupied RF subband. Possible receiver RFLO leakage and self-mixing is manifested as DC offset in the digitized IQ signals. A low bandwidth DC canceller can remove the impact of RF LO self-mixing. Impact of cross-coupling RF leakage is minimized because the RFLOs are out-of-band interferers.
The compartmentalized direct conversion receiver has an RF-in-digital-out structure with digitized serial low voltage differential signaling (LVDS) 16-bit ADC samples sent to a modem module, such as a modem FPGA. It minimizes possibility of cross-coupling interferences between subbands. The serial LVDS runs at about 480 MHz DDR clock rate to transport 16-bit IQ samples.
Signal images resulting from gain and phase imbalance are digitally corrected. Imbalance resulting from unmatched IQ analog filtering responses is minimized from component selection and board manufacturing.
The transceiver can be adapted to other frequency bands by specifying foot-print compatible RF SAW filters for the desired frequency band. RF subbanding can be flexibly maintained by modifying the bandwidth of analog low-pass filters. The wide dynamic range of the ADC further allows relaxation of limited rejection ability of RF SAW pre-selectors.

Figure 3:
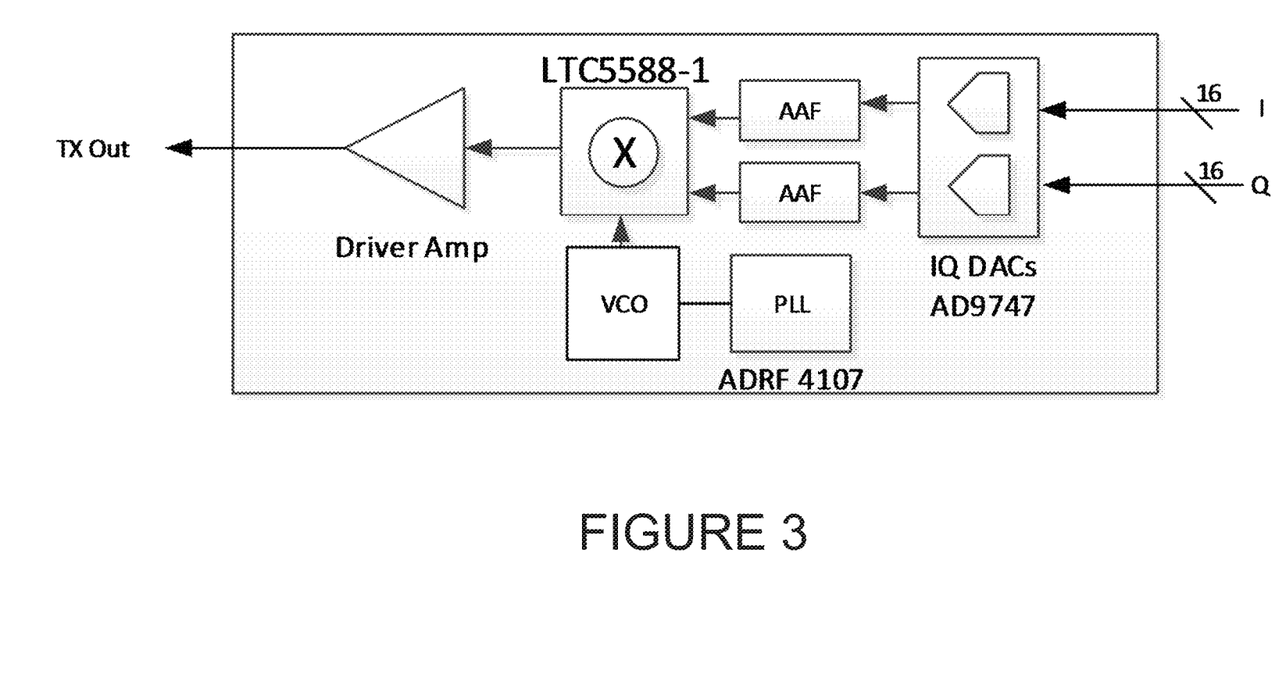
FIG. 3 is an illustration of a Link-16/TACAN fast hopping transmitter.
Figure 4:
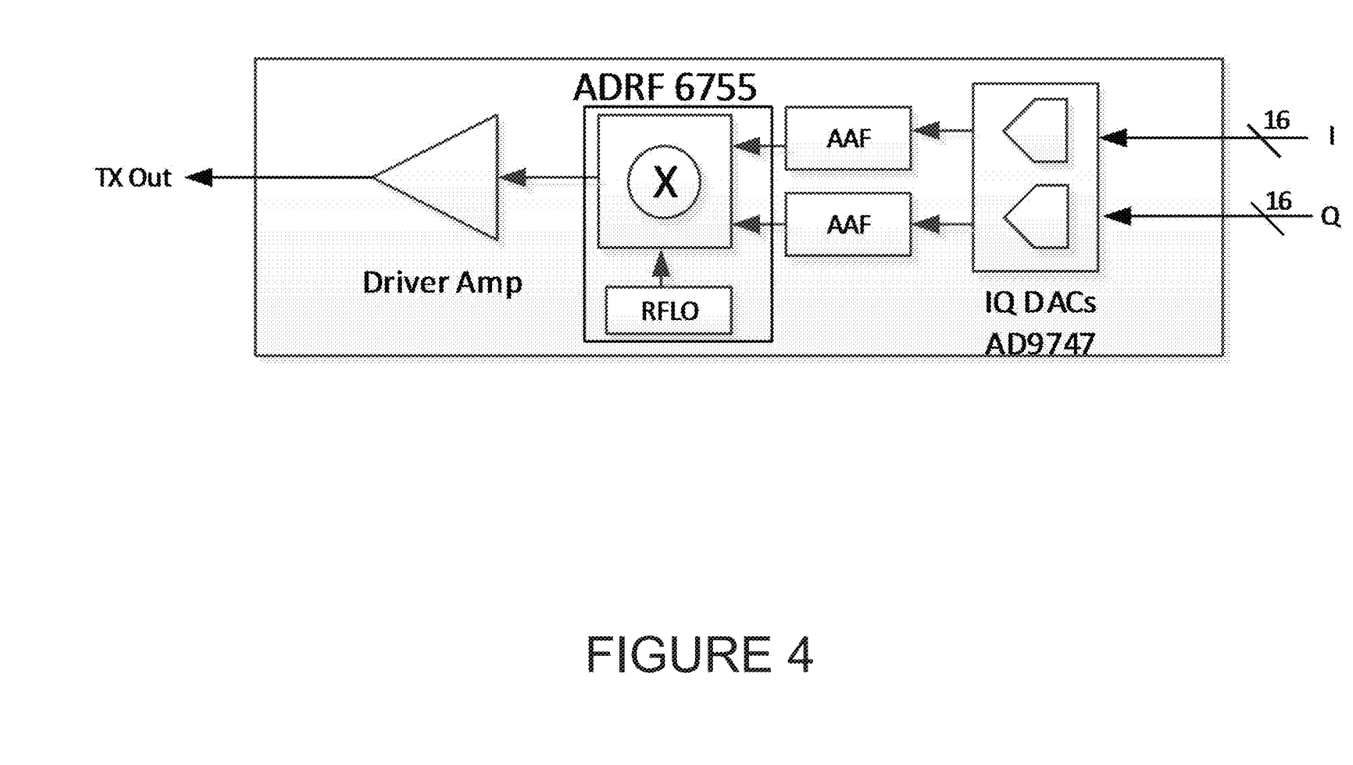
FIG. 4 is an illustration of a dedicated non-hopping IFF transmitter.

The L-band transmit building block of direct up conversion is shown in FIGS. 3 and 4. There are two types of transmitters. For Link 16 operations, a fast-hopping PLL/VCO synthesizes Link 16 carriers and settles within 4 us. 16-bit dual IQ DACs enable Link-16 CPSM modulation to produce clean signals and, more importantly, reject transmit noises in the 1030 and 1090 IFF exclusion bands. At 120 MHz DAC sampling rate, the AAF cutoff frequency can be moved away from signal bandwidth while adequately removing image signals. In so doing, the ripple characteristic of the Link-16 pulses is preserved and negligibly degraded.

For non-hopping waveforms such as IFF and TACAN, an off-the-shelf IQ modulator chip can be used with an integrated IQ modulator, PLL, and VCO all in one chip. It allows for miniaturization of the transmitter and saves power consumption.

Advantages of direct conversion transmitter include
Minimum gain stages needed, allowing miniaturization of the transmitter.
Direct DAC output into the IQ modulator with only passive alias filtering. Baseband harmonic distortion is kept to a minimum level.
Image resulting from IQ imbalance of the transmitted signal is contained in the desired signal. For imbalance better than easily achievable 40 dB, there is negligible degradation of the transmit signal integrity.
Carrier feedthrough resulting from imbalanced DC offset can be calibrated and minimized.
Digital-in-RF-out structure allows clean signal layout with negligible noise coupling. The inherent high dynamic range allows high fidelity of transmitted signal.

The direct conversion transmitter can support wide range of growth functions and easily tunable to fit bandwidth, hopping rate, and multi-carrier transmission.

Due to high linearity, the transmitter is capable of multi-carrier transmission with low intermodulation products. The small size allows multiple transmitters to be added in the future for multi-user environment.

Within the L-band transceiver architecture, the RF SAW pre-selectors may limit the operating frequency bands. In direct conversion receiver design, IQ down-converter can operate from 30 MHz to 3 GHz with proper component selection (footprint compatible) and RF matching. IQ up-converter can operate from 5 MHz to 6 GHz. The baseband channel bandwidth is tunable with proper selection of RLC values. The transmitter can also perform fast hopping and coherent phase locking providing proper selection of VCO. A key benefit of this architecture is that it can be retargeted to other frequency bands with minimum effort, providing for growth opportunities to other areas of the spectrum using the existing transceiver.

Modem modules, such as L-band modem FPGAs, may adopt the footprints of one or more commercially available FPGAs. The key consideration is the cost of FPGA can be scaled down according to functionality and resource. Additionally, a four-core processor can offload the majority of the symbol rate processing with the ability to add Turbo coding and enhance performance. The L-band modem is an ideal platform to build future waveforms.

L-band Modem VPX 3U Mechanical Sizing

Figure 5:
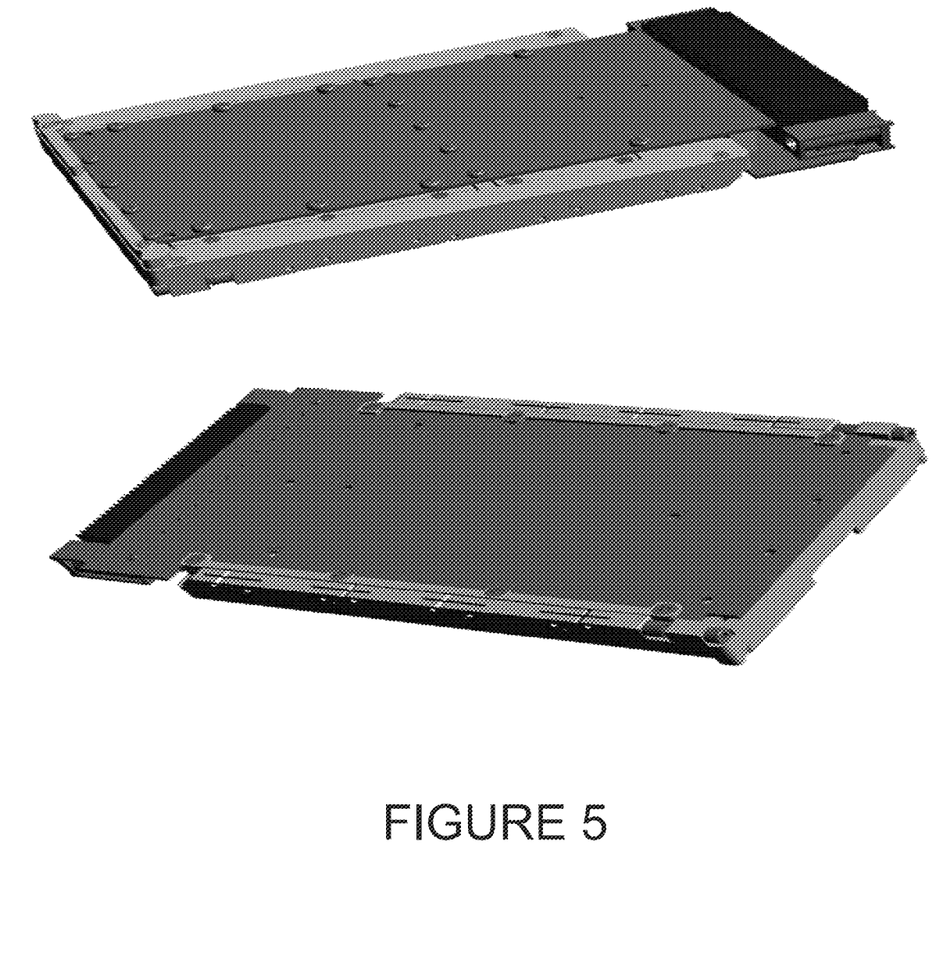
FIG. 5 is an illustration of an example of an L-band modem VPX 3U.

The direct conversion architecture allows miniaturization of the transceiver design to fit into a VPX 3U form factor. For ease of manufacturing and board layout, a two-board solution is proposed. FIG. 5 shows the 3-D drawing of the 3U SRU assembly. Components are shielded between the two boards with ground planes acting as RF shields.

Figure 6:
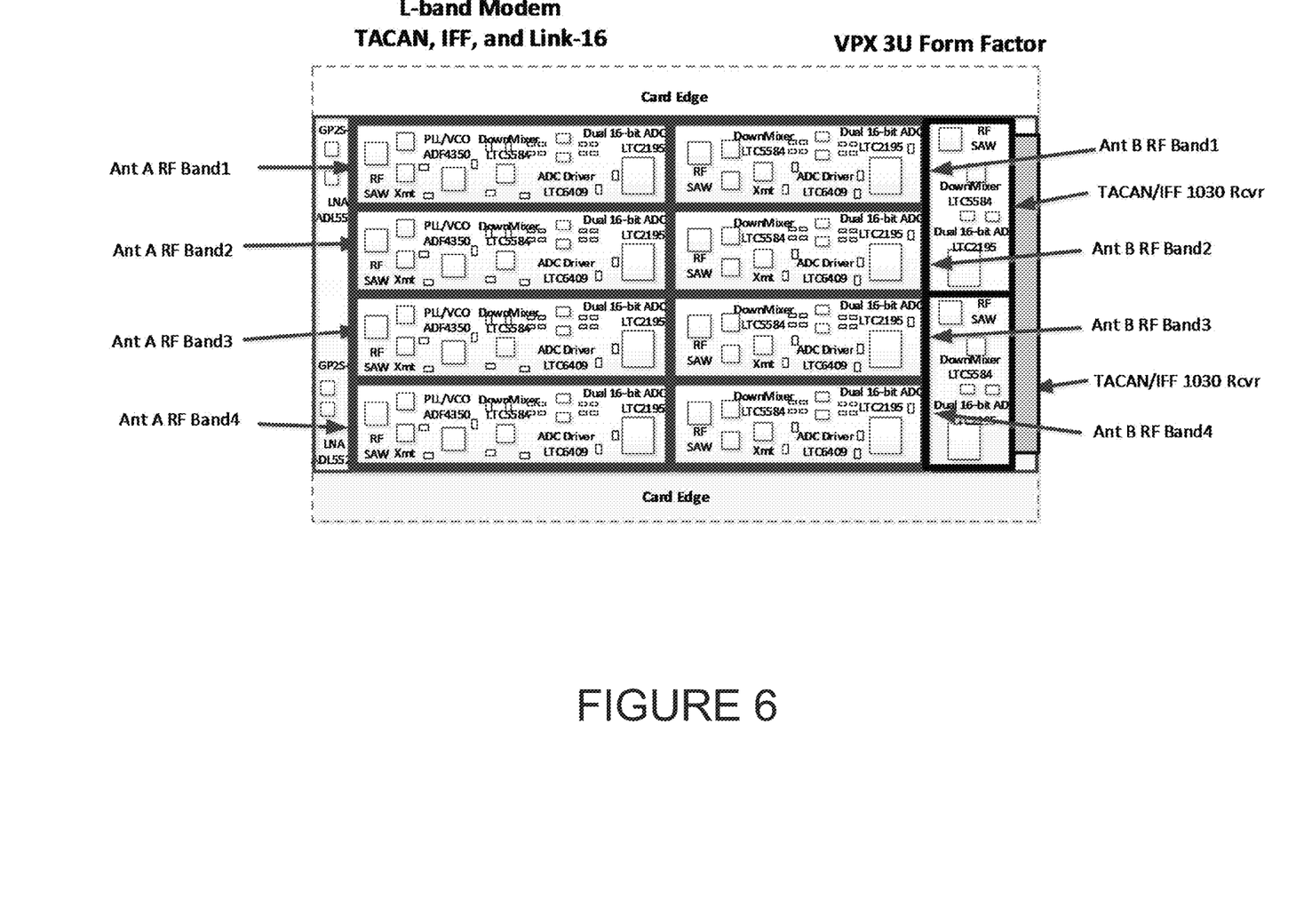
FIG. 6 is an illustration of the sizing and layout of the top-side receiver board.

FIG. 6 shows exemplary sizing of the receiver board hosting ten of the direct conversion receivers. For each receiver, there are 6 lanes of serial LVDS (one for clock and one for frame) of 16-bit 120 MHz ADC samples. For ten receivers, there are a total of 60 lanes of differential LVDS signals. These ADC samples are received in the FPGA through a board interconnect. Because these are LVDS signals, there is negligible concern of signal integrity.

On the backside of the board, there are bypass caps and passive components. Noise cross-coupling is minimized. Additionally, due to the simplistic structure of the direct conversion receiver, there is no need for a high-density multi-layer PWB wiring board. The manufacturing cost of the receiver board is reduced and reliability enhanced.

Figure 7:
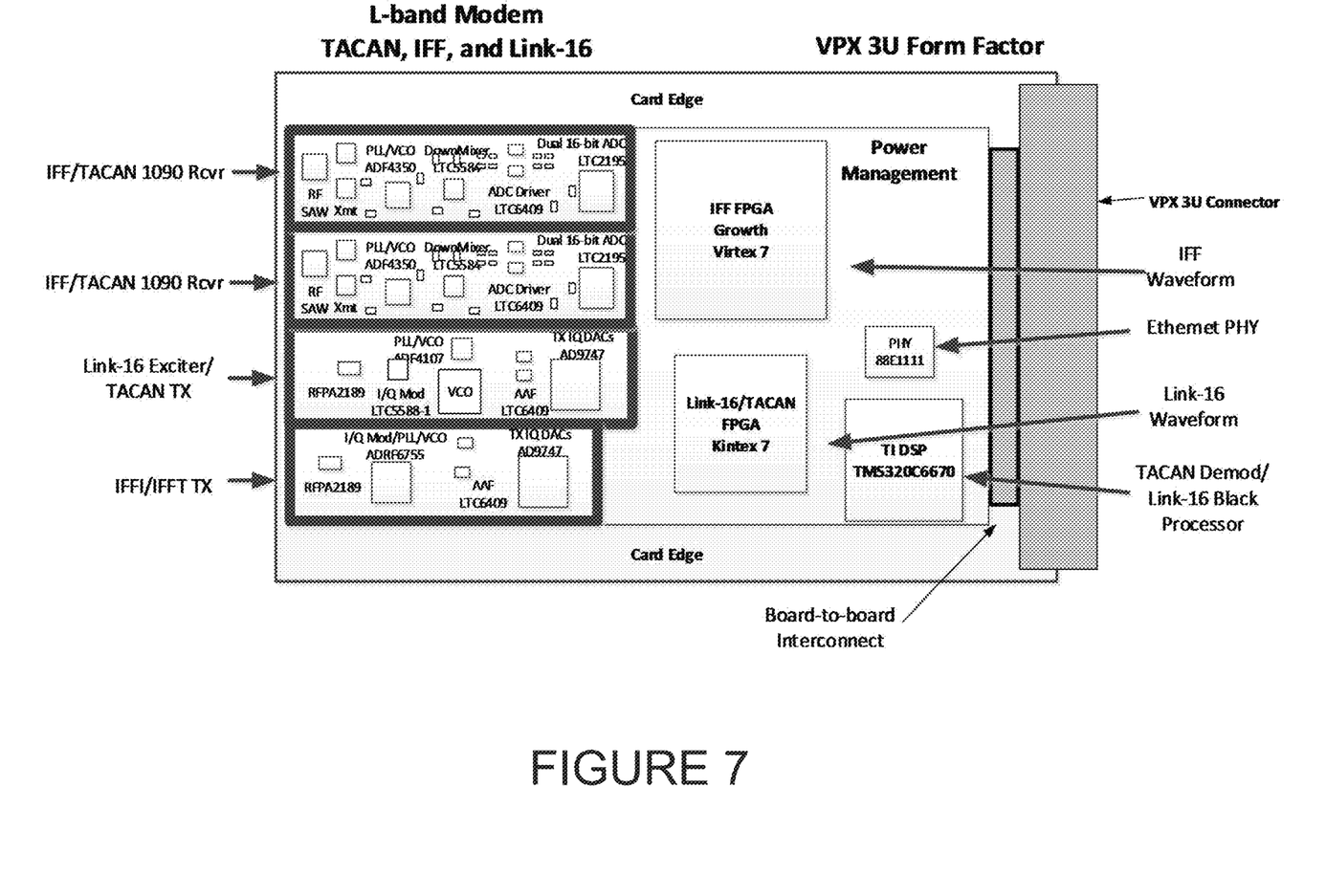
FIG. 7 is an illustration of the sizing and layout of the bottom-side transmit and FPGA board.

For the transmit and FPGA modem board, the placement and sizing is shown in FIG. 7. Memory chips, bypass caps, and supporting functions that have low profile are on the back-side of the board. There is also significant space available for additional FPGA extensions.

L-band Modem Firmware Architecture

Figure 8:
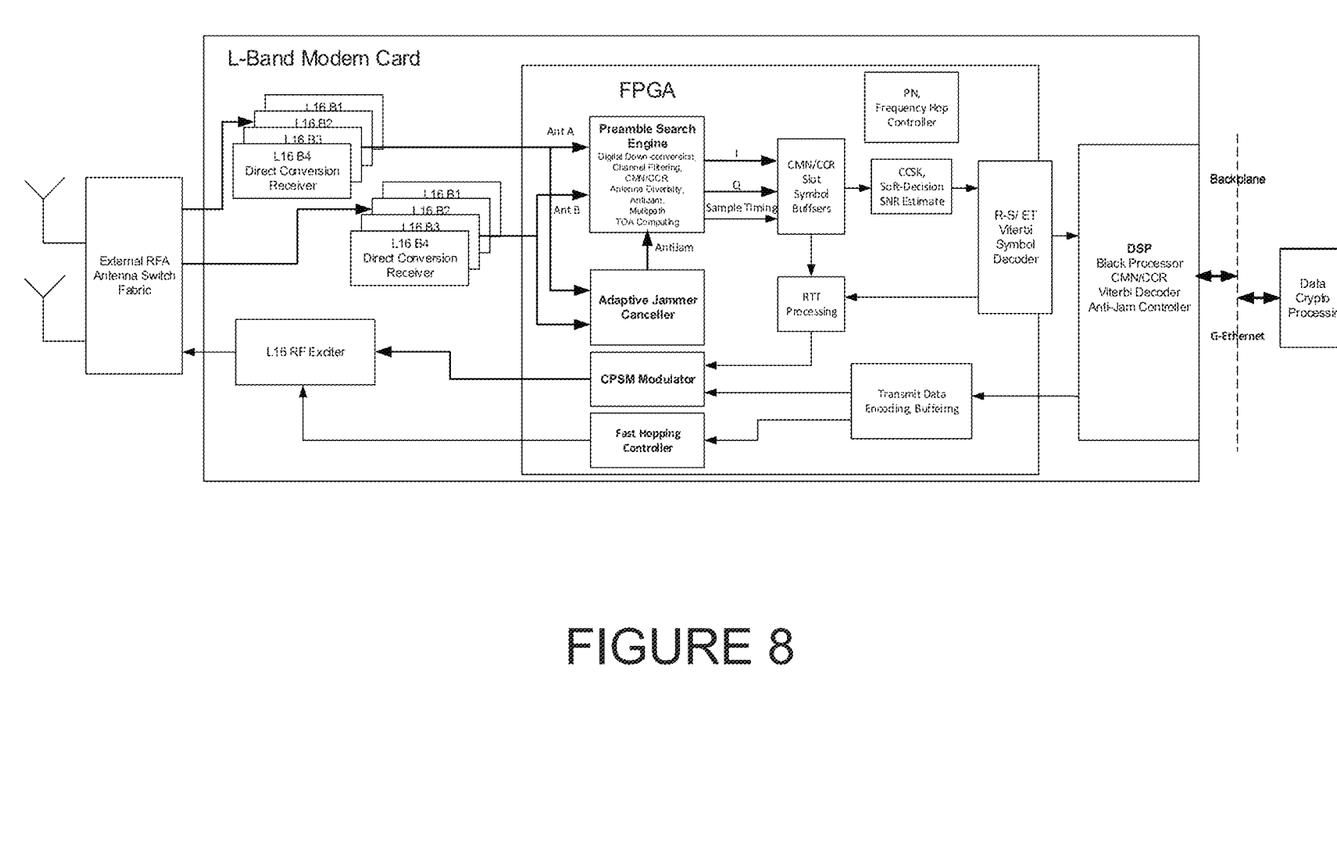
FIG. 8 is an illustration of a Link-16 modem functional block diagram.

The high-level functional block diagram of the L-band modem card for Link-16 operation is shown in FIG. 8. The RF transceiver is tightly integrated into the digital processing blocks. For RF front-end processing, the direct conversion receiver converts Link 16 carriers into low IF digital signals at a 120 MHz sampling clock. All IQ data streams from the eight RF sub-bands are synchronized to the global 120 MHz at the FPGA input through proper use of the FPGA delay cells. For preamble search and channel filtering, the DSP slices are configured to perform multi-processing at higher speed with filter tap weights set for down-conversion and channel filtering. Multiple CMN-X nets and CCR preambles can be detected during the parallel processing. A DSP slice is constructed with control logics, ALU, and a 25×18 multiplier operating in excess of 600 MHz clock synchronized with the 120 MHz main clock. By configuring each DSP slice with a state machine, each DSP slice performs as a pico-processor with highly reduced logic gates. Over ten thousand of the DSP slices can be utilized for massive parallel processing. The software defined DSP processing easily allows extension beyond four CMN nets, beyond the capability of other transceivers which may be limited to a maximum of four nets.

The Link 16 modem is equipped with an anti jam algorithm that adaptively removes correlated jammer signals on both antennas as a free-running filter. Adaptation rate is adjusted to match the platform kinematic model. This anti-jam signal stream creates an additional receive diversity besides Antenna A and Antenna B. In non jam environment, Antenna A and Antenna B diversity signals dominate the signal quality and provide for strong signals for Link-16 message reception. In heavily jammed environments, the adaptive anti jam filer removes jammer signals in a root-mean-square sense. Desired Link 16 message signals can pass through without significant degradation despite very strong jammers present in the receive signal. This method has been tested and proven to provide best anti jam performance with minimal investment of hardware complexity.

After RF front-end processing, the Link 16 modem leverages Link-16 firmware and extends to CMN-X/CCR capability. To endow Link-16 ET mode with better anti jam capability, each ET chip is converted to soft-decision symbols based on SNR detected through pilot chips for individual pulses. Doing so, the ET0 mode can outperform STD-DP in anti jam capability because of the ⅓ convolutional coding rate. When coupled with an adaptive anti jam filter, L-band modem can operate at maximum ET data rate in most environments without sacrificing AJ performance.

Figure 9:
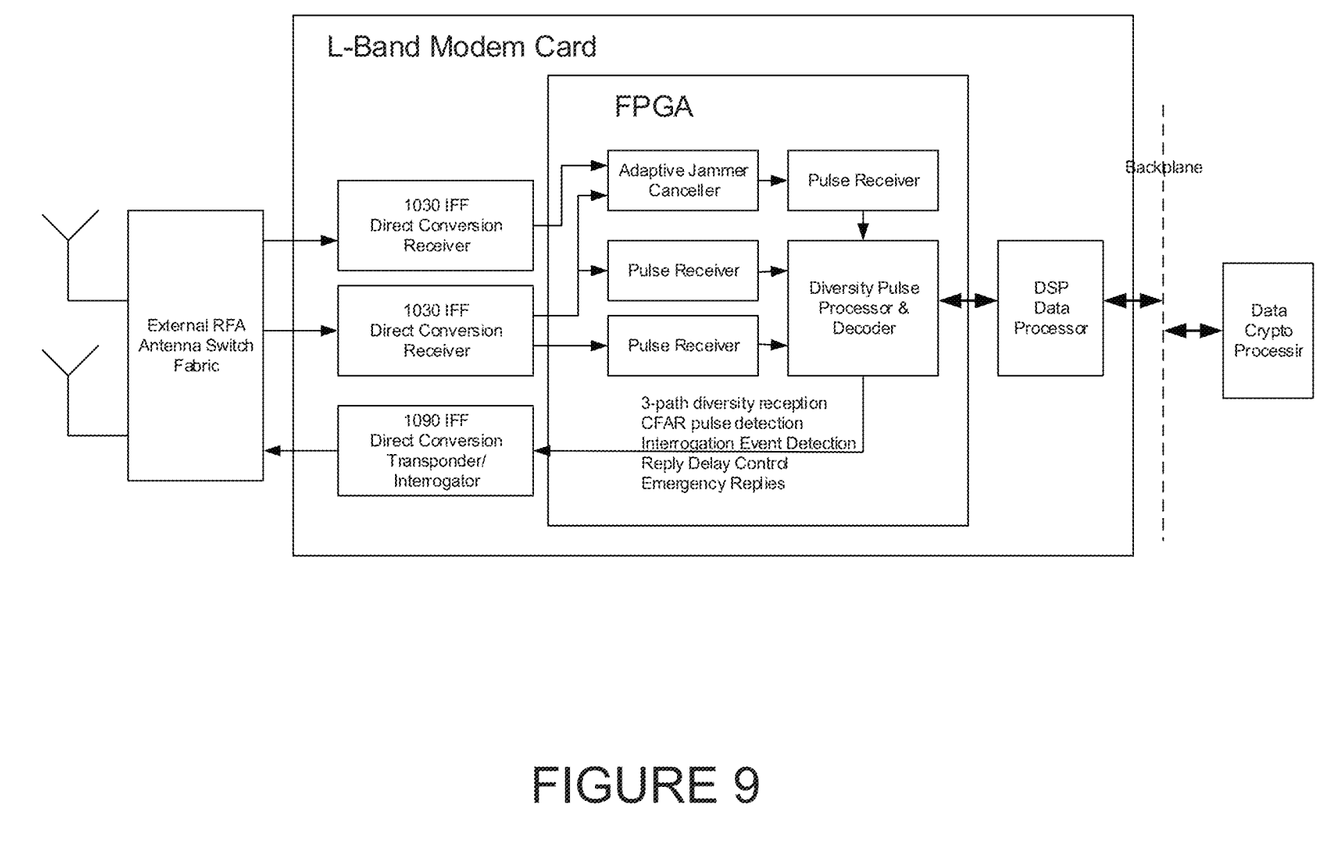
FIG. 9 is an illustration of an IFF transponder modem architecture.

Two direct conversion receivers that are tuned to 1030 MHz carrier frequency are dedicated to IFFT function for diversity reception. Because of the tightly coupled RF and FPGA structure, the greatest signal path delay is in the pipeline ADC sample delay of eight clock cycles (about 60 ns). That leaves a large margin for implementing the stringent SIF transpond response time.

As with the active jammer canceller stated in the Link-16 modem architecture, in hostile and jammed radio environments as well as in friendly co-site environments, the identical jammer/interferer signals present at both antennas can be highly reduced. The anti jam output serves as an additional diversity IQ signal stream to augment Antenna A and Antenna B diversity receivers. The canceller data stream serves especially well when the jammer power level overwhelms desired signal level.

The IFF diversity receivers are 16-bit wide dynamic range linear receivers. The linear nature of these receivers is especially suited for the Mode 5 and Mode S MSK modulated waveforms.

Figure 10:
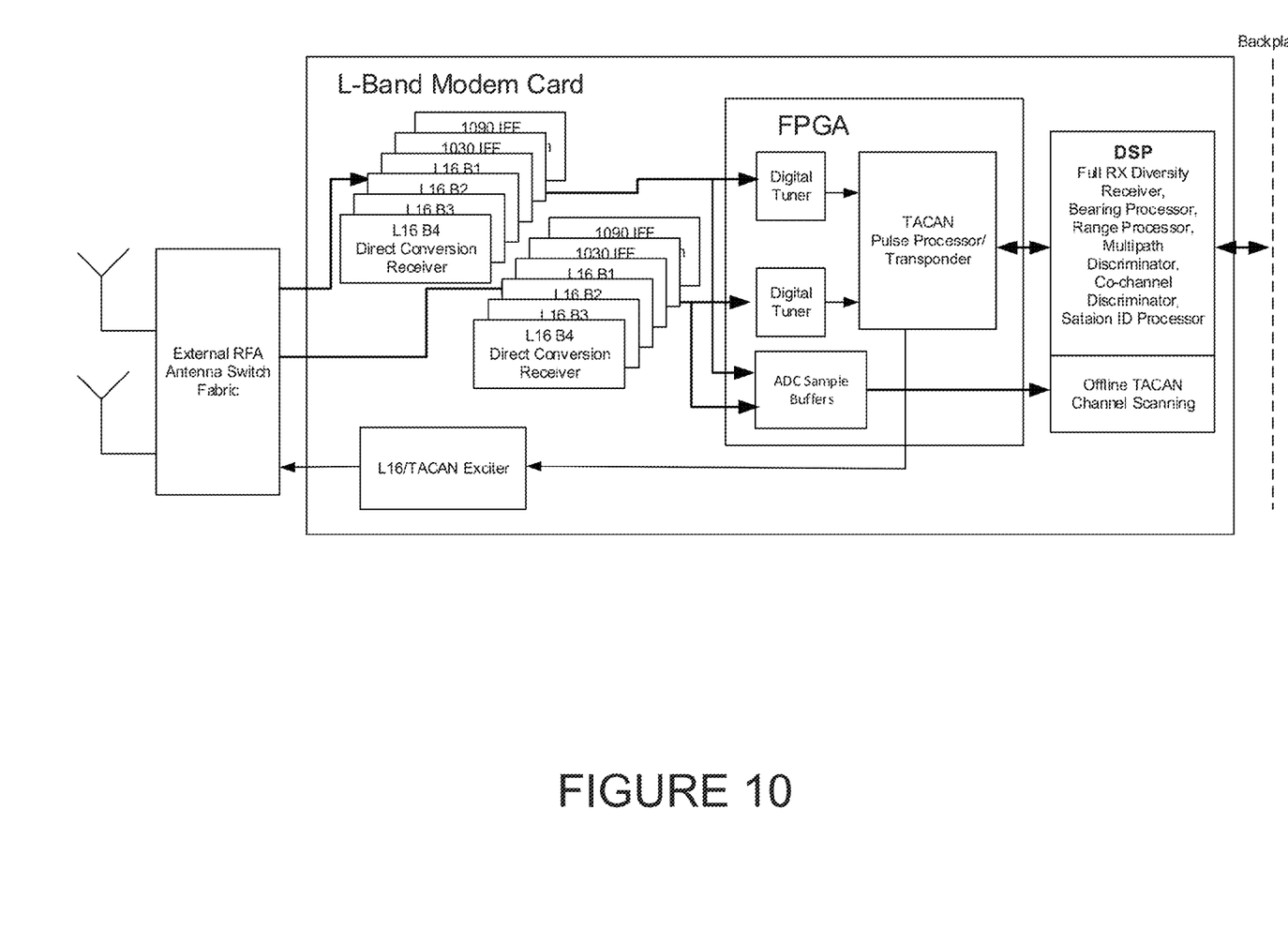
FIG. 10 is an illustration of a TACAN modem architecture.

The TACAN modem architecture reuses the Link-16 four subband IQ data streams and shares IFF 1030 MHz digitized receiver signals for channel operations that fall in tine 1030 IFF band. These receivers are powered on when the Link 16 waveform and the IFF waveform are operating. Additionally, two more direct conversion receivers tuned to 1090 MHz IFF band are added to the TACAN modem in the event when the TACAN operating channel is set to the 1090 MHz IFF band. These 1090 MHz receivers can be used for IFF interrogation by adding an IFFI modem to the L-band modem, which has been designed in as a pre-planned product improvement accomplished with a SW/FW update.

In the L-band modem, DSP hosts the TACAN bearing and range processing while the FPGA implements Constant False Alarm Rate (CFAR) pulse detection for TACAN pulse patterns of main reference bursts, auxiliary reference bursts, squitters, identification pairs, interrogation pulses, and reply pulses. C6670 contains four high-speed C66x cores and running at 1.2 GHz. Additionally, for hardware acceleration, there are four Viterbi decoder coprocessors, four Turbo decoder coprocessors, and three FFT coprocessors to handle various tasks. For TACAN bearing processing, two digital phase lock loops for each antenna track the 15 and 135 Hz phase and modulation indexes. By detecting anomalies in the modulation indexes, the TACAN processor can mitigate bearing wander phenomenon that has affected earlier TACAN receivers. With full receive diversity from the upper and lower antennae, anomalies due to multipath impairment will be mitigated. Furthermore, with the 16-bit wide dynamic receiver and full receive diversity processing, the TACAN receiver can accurately differentiate multipath air-to-air range reporting.

In addition to TACAN bearing and range processing, the L-band modem will host ADC sample buffers for testing and off-line processing. When coupled with the powerful TI DSP multiprocessors, the TACAN thread is able to perform off-line scanning of available TACAN stations, bearing, station ID, and any air-to-air TACAN channels that are in use. The ADC sample buffer can also be used for off-line threat analysis and full L-band spectrum usage analysis.

The addition of TI DSP processing allows smooth upgrades of signal processing capability for growth function. It is a powerful addition to maintain technical edges of the L-band modem modernization.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A transceiver comprising:
   a) a first direct conversion receiver (DCR) configured to receive Link 16 signals in one of several sub-bands, each of the several sub-bands having a unique frequency range, the first DCR having a minimum usable signal dynamic range of 80 dB, the first DCR comprising:
      i. a frequency converter configured to frequency-convert signals received at the center frequency of the received sub-band into a zero-frequency complex signal pair composed of in-phase (I) and quadrature (Q) signal components, the frequency converter having an in-phase Local Oscillator (I-LO) input, a quadrature local oscillator (Q-LO) input, an I signal output and a Q signal output; and
      ii. an LO having an I-LO output coupled to the I-LO input of the frequency converter and a Q-LO output coupled to the Q-LO input of the frequency converter, the LO outputting a signal at a frequency which, when applied to the LO inputs of the frequency converter, will down-convert an RF signal with a frequency at the center of the sub-band applied to the input of the frequency converter to the zero-frequency complex signal pair composed of in-phase (I) and quadrature (Q) signal components;
      iii. a first low noise amplifier/analog to digital converter (LNA/ADC) driver, having an input and an output, the input coupled to the I signal output of the frequency converter;
      iv. a second LNA/ADC driver having an input and an output, the input coupled to the Q signal output of the frequency converter;
      v. a first analog to digital converter (ADC) having an output and an input, the input coupled to the output of the first LNA/ADC driver, the first ADC sampling the output of the first LNA/ADC at a rate that is substantially higher than the highest frequency of interest and generating a digital stream of data provided to the output; and
      vi. a second ADC having an output and an input, the input coupled to the output of the second LNA/ADC driver, the second ADC sampling the output of the second LNA/ADC at a rate that is substantially higher than the highest frequency of interest and generating a digital stream of data provided to the output;
b) a plurality of additional DCRs, each having essentially identical constituent components to the first DCR, and each receiving Link 16 signals in a sub-band having a unique frequency range from the frequency ranges of the sub-bands received by each other DCR; and
c) a modem module having a plurality of inputs, each input coupled to the output of an associated ADC of each of the DCRs and configured to reconstruct message information modulated on each signal received from both ADCs of each DCR.

2. The transceiver of claim 1, the modem module being a field programmable array (FPGA).

3. The transceiver of claim 2, the FPGA including FPGA delay cells configured to synchronize the I and Q data streams output from each ADC.

4. The transceiver of claim 1, at least two of the received Link 16 signals being received simultaneously.

5. The transceiver of claim 1, the first DCR, the plurality of additional DCRs and the modem module comprising an L-band modem receiver.

6. The transceiver of claim 5, the first DCR configured to receive signals from a first antenna, the plurality of additional DCRs comprising three DCRs configured to receive signals from the first antenna, the transceiver further including four antenna 2 Link 16 DCRs, each antenna 2 Link 16 DCR essentially identical to the first DCR, with the exception that each antenna 2 Link 16 DCR is configured to receive signals from a second antenna, the first of the four antenna 2 Link 16 DCRs shares the LO with the first DCR, and each of the other antenna 2 Link 16 DCRs shares an LO with a corresponding one of the plurality of additional DCRs.

7. The transceiver of claim 6, further including a first tactical air navigation system (TACAN) DCR configured to receive signals from the first antenna and a second TACAN DCR configured to receive signals from the second antenna.

8. The transceiver of claim 7, the first and second TACAN DCRs having essentially identical constituent components to the first DCR, each TACAN DCR receiving signals in the TACAN band rather than in a Link 16 sub-band.

9. The transceiver of claim 8, the first and second TACAN DCRs sharing one LO.

10. The transceiver of claim 7, further including a first identification friend or foe (IFF) DCR configured to receive signals from the first antenna and a second IFF DCR configured to receive signals from the second antenna.

11. The transceiver of claim 10, the first and second IFF DCRs each having essentially identical constituent components to the first DCR, each IFF DCR receiving signals in the IFF band rather than in a Link 16 sub-band.

12. The transceiver of claim 11, the first and second IFF DCR sharing one LO.

13. The transceiver of claim 1, each DCR further comprising an I anti-aliasing filter coupled between the output of the first LNA/ADC driver and the input to the first ADC and a Q anti-aliasing filter coupled between the output of the second LNA/ADC driver and the input to the second ADC.

14. The transceiver of claim 13, the I anti-aliasing filter and the Q anti-aliasing filter each being an analog Chevychev filter.

15. The transceiver of claim 1, the frequency converter having a second-order input intercept point (IIP2) greater than +60 dBm and a third-order input intercept point (IIP3) calibrated to be greater than +85 dBm.

* * * * *